(12) United States Patent
Taylor et al.

(10) Patent No.: US 8,789,839 B1
(45) Date of Patent: Jul. 29, 2014

(54) REMOVABLE FENDER FOR A ROAD GRADER

(76) Inventors: Timothy Taylor, Delta, UT (US);
Kandie Taylor, Delta, UT (US)

( * ) Notice: Subject to any disclaimer, the term of this patent is extended or adjusted under 35 U.S.C. 154(b) by 57 days.

(21) Appl. No.: 13/585,026

(22) Filed: Aug. 14, 2012

(51) Int. Cl.
*B62D 25/16* (2006.01)

(52) U.S. Cl.
USPC .......................................... 280/154; 280/849

(58) Field of Classification Search
USPC .............. 280/847, 848, 153.5, 154, 849, 851, 280/156, 157, 853, 854
See application file for complete search history.

(56) References Cited

U.S. PATENT DOCUMENTS 6,349,954 B1 * 2/2002 Deziel ........................... 280/156
2008/0029989 A1 * 2/2008 Griffiths ........................ 280/154

* cited by examiner

*Primary Examiner* — John Walters
(74) *Attorney, Agent, or Firm* — Kyle A. Fletcher, Esq.

(57) ABSTRACT

The removable fender for a road grader attaches to the road grader, and is located just ahead of a forward rear tire of said road grader. The road grader fender is positioned at an angle in order to divert debris that is flown up and forwardly from the rear tires during use. The road grader fender is designed to protect the glass and mirrors of the cab from damage associated with flying debris. The road grader fender includes a fender that is affixed to a fender bar, which can be installed and removed with respect to a mounting plate. The mounting plate is affixed to a surface of the road grader just ahead of a forward rear tire of said road grader. The mounting plate includes a gusseted mounting bracket into which the fender bar is inserted and secured in place via a clevis pin.

10 Claims, 5 Drawing Sheets

REMOVABLE FENDER FOR A ROAD GRADER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fenders and heavy machinery, more specifically, a removable fender for use with a road grader.

Road graders are large pieces of heavy machinery that are used to grade out dirt for a road prior to smoothing and paving of a new road. The road graders move a lot of dirt when in service, and can cause damage to itself when dirt or other debris is tossed upwardly. A fender is needed to protect the wheels and tires and the road grader when in use. The device of the present application seeks to address this need by providing a removable fender that attaches to the road grader just behind the cab, and which is strategically oriented to divert debris that is flying up and forward from the rear tires, which can cause damage to the glass and mirrors associated with the cab during use of the road grader.

B. Discussion of the Prior Art

As will be discussed immediately below, no prior art discloses a road grader fender that attaches to the road grader, and is located just ahead of a forward rear tire of said road grader; wherein the road grader fender is positioned at an angle in order to divert debris that is flown up and fowardly from the rear tires during use; wherein the road grader fender is designed to protect the glass and mirrors of the cab from damage associated with flying debris; wherein the road grader fender includes a fender that is affixed to a fender bar; wherein the fender bar can be installed and removed with respect to a mounting plate; wherein the mounting plate is affixed to a surface of the road grader just ahead of a forward rear tire of said road grader; wherein the mounting plate includes a gusseted mounting bracket into which the fender bar is inserted and secured in place via a clevis pin; wherein the fender attaches to the fender bar via a curved support that enables flexation to occur between the fender and the mounting plate when in contact with debris thrown up from the two rear tires of the road grader; wherein the fender has a curvature.

The Weinkauf Patent (U.S. Pat. No. 5,839,745) discloses fender assemblies for use with road graders and the like that prevent mud, dust snow, or other substances on the ground or road surface from being thrown up by the grader tires. However, the fender assemblies do not include a curvature in the fender or a curved support that provides for flextion to occur when the fender is impacted with debris.

The Vis et al. Patent (U.S. Pat. No. 3,497,237) discloses a front fender for tractors. However, the front fender is not a fender specifically adapted for use with a road grader, and which includes a curved support providing flexation to a fender positioned just behind a tire.

The Daniel Patent (U.S. Pat. No. 6,349,954) discloses a fender apparatus for a grader. However, the fender apparatus is not a fender that can attach and detach between uses.

The Callan et al. Patent (U.S. Pat. No. 7,222,884) discloses a mudguard for the wheel of an agricultural vehicle. Again, the mudguard is not a detachable fender that extends behind a tire of a road grader to stop flying debris.

The Weaver Patent (U.S. Pat. No. 6,533,323) discloses a quarter fender for a tractor. However, the fender does not attach and detach behind all tires of a road grader.

While the above-described devices fulfill their respective and particular objects and requirements, they do not describe a road grader fender that attaches to the road grader, and is located just ahead of a forward rear tire of said road grader; wherein the road grader fender is positioned at an angle in order to divert debris that is flown up and forwardly from the rear tires during use; wherein the road grader fender is designed to protect the glass and mirrors of the cab from damage associated with flying debris; wherein the road grader fender includes a fender that is affixed to a fender bar; wherein the fender bar can be installed and removed with respect to a mounting plate; wherein the mounting plate is affixed to a surface of the road grader just ahead of a forward rear tire of said road grader; wherein the mounting plate includes a gusseted mounting bracket into which the fender bar is inserted and secured in place via a clevis pin; wherein the fender attaches to the fender bar via a curved support that enables flexation to occur between the fender and the mounting plate when in contact with debris thrown up from the two rear tires of the road grader; wherein the fender has a curvature. In this regard, the removable fender for a road grader departs from the conventional concepts and designs of the prior art.

SUMMARY OF THE INVENTION

The removable fender for a road grader attaches to the road grader, and is located just ahead of a forwardmost rear tire of said road grader. The road grader fender is positioned at an angle in order to divert debris that is flown up and forwardly from the rear tires during use. The road grader fender is designed to protect the glass and mirrors of the cab from damage associated with flying debris. The road grader fender includes a fender that is affixed to a fender bar, which can be installed and removed with respect to a mounting plate. The mounting plate is affixed to a surface of the road grader just ahead of a forward rear tire of said road grader. The mounting plate includes a gusseted mounting bracket into which the fender bar is inserted and secured in place via a clevis pin. The fender attaches to the fender bar via a curved support that enables flexation to occur between the fender and the mounting plate when in contact with debris thrown up from the two rear tires of the road grader.

An object of the invention is to provide a detachable fender for use with a road grader to prevent debris from flying up and forwardly from the rear tires of the road grader, which occurs during use of the road grader.

A further object of the invention is to provide a curved support that connects the fender to a fender bar, and which provides flexation to occur during impact of debris against said fender.

Another object of the invention is to provide a mounting plate that is affixed to a side of the road grader, and places the fender just above and in front of the forward most of the rear tires.

Another object of the invention is to include a gusseted mounting bracket that extends from the mounting bracket, and enables the fender bar to attach thereto via a clevis pin.

These together with additional objects, features and advantages of the removable fender for a road grader will be readily apparent to those of ordinary skill in the art upon reading the following detailed description of presently preferred, but nonetheless illustrative, embodiments of the removable fender for a road grader when taken in conjunction with the accompanying drawings.

In this respect, before explaining the current embodiments of the removable fender for a road grader in detail, it is to be understood that the removable fender for a road grader is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the removable fender for a road grader.

It is therefore important that the claims be regarded as including such equivalent construction insofar as they do not depart from the spirit and scope of the removable fender for a road grader. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates a side view of the removable fender and fender bar in connection with the gusseted mounting bracket, and further detailing the connection of the clevis pin there between;

DETAILED DESCRIPTION OF THE EMBODIMENT

Figure 1:
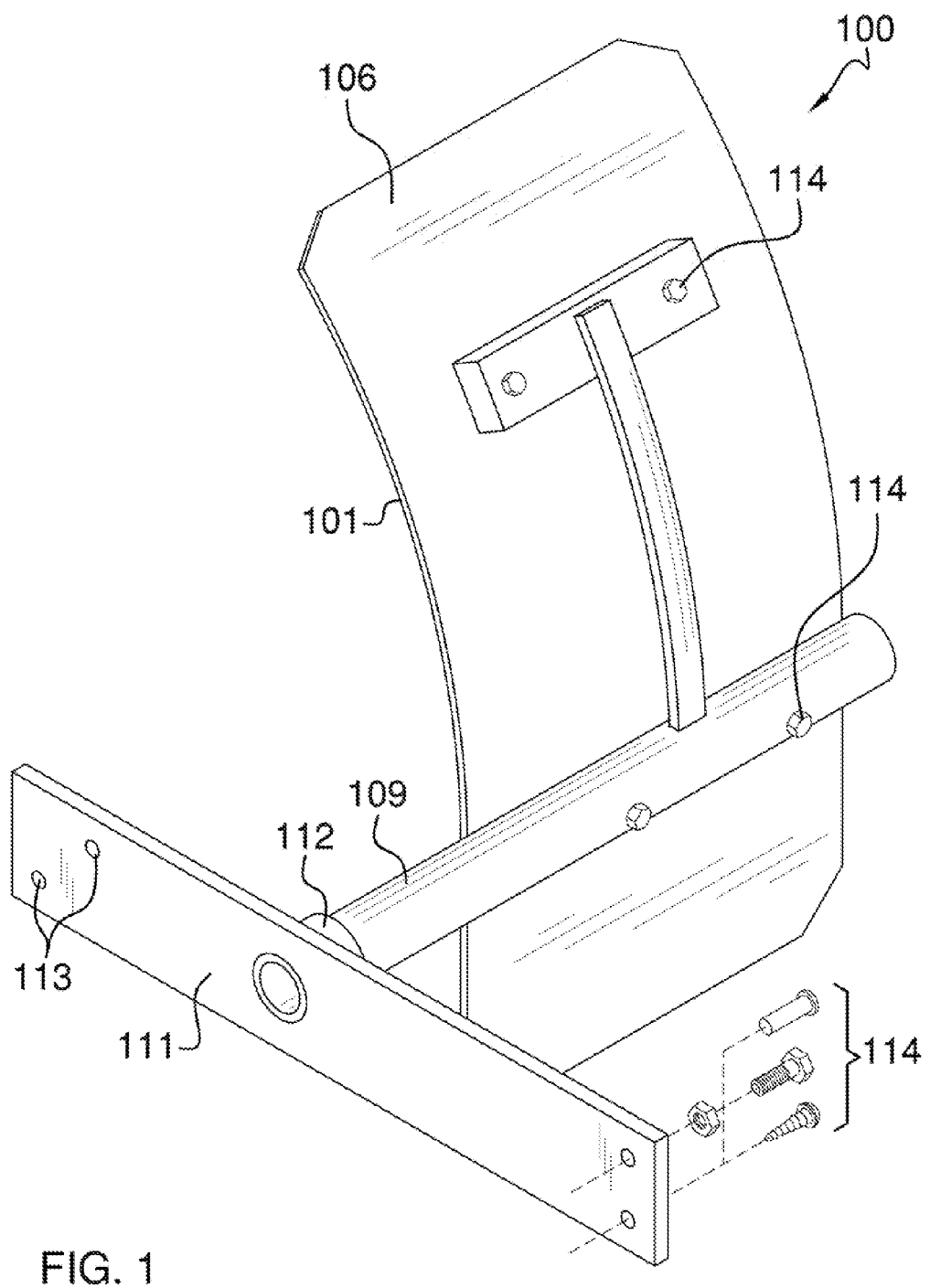
FIG. 1 illustrates a perspective view of the removable fender for a road grader by itself and depicting the fender arm connected to the mounting plate.
Figure 2:
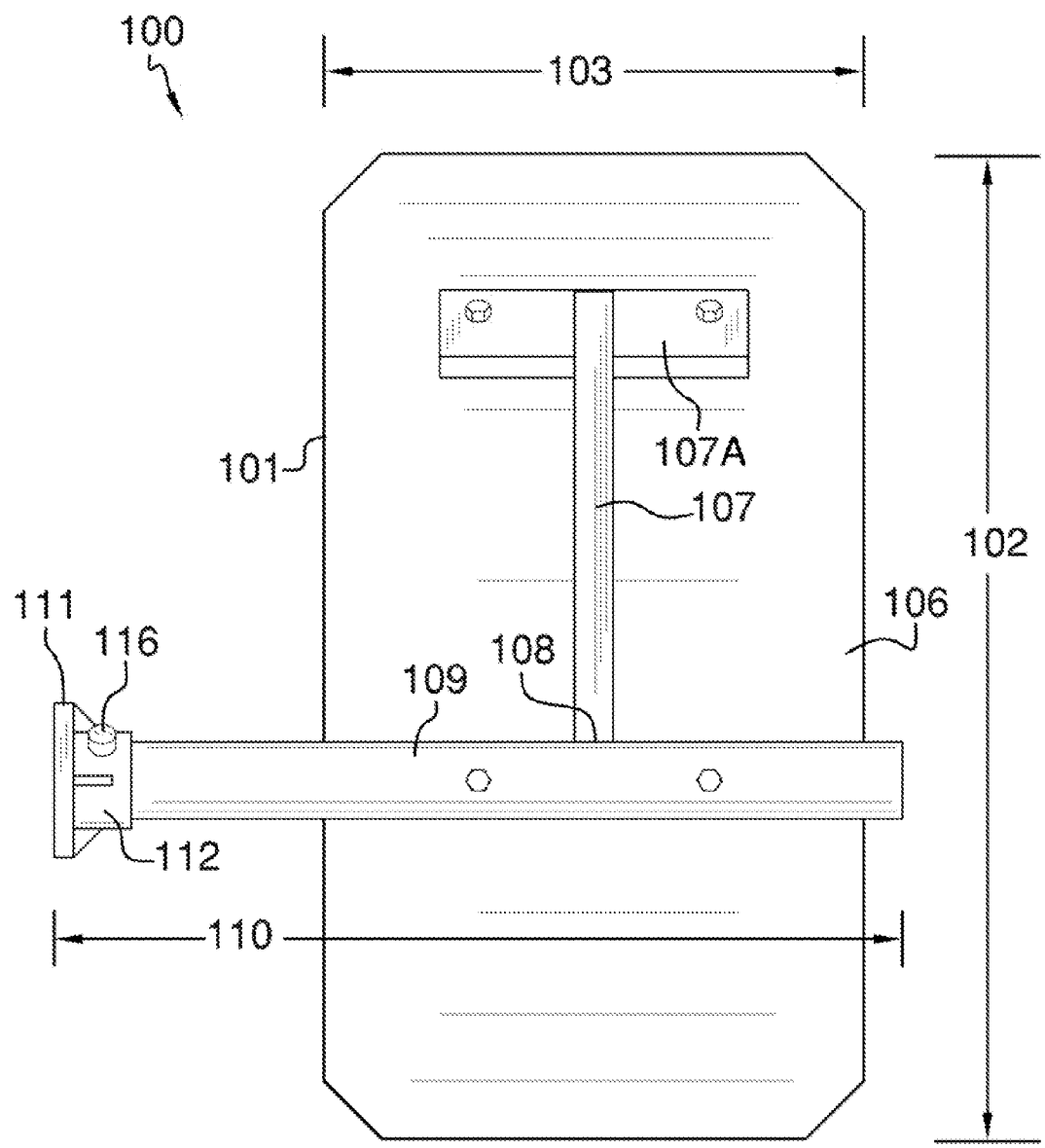
FIG. 2 illustrates a side view of the removable fender for a road grader by itself.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A removable fender for a road grader 300 (hereinafter invention) includes a fender 101 of an undefined length 102 and an undefined width 103 defining an area. The fender 101 has a slight curvature 104 to provide improve coverage and protection against flying debris 140.

The fender 101 is further defined with an inner surface 105 and an outer surface 106. The fender 101 is also of thin-walled construction, and is made of a material suitable for absorbing forces attributed with the intended use. A curved support 107 attaches to the outer surface 106 of the fender 101. The curved support 107 includes a cross brace 107A that forms a "T" shape to the cross brace 107. The cross brace 107A improves the connection between the fender 101 and the curved support 107 by reducing any torsional forces produced there between. The curved support 107 extends downwardly and connects at a distal end 108 to a fender arm 109.

Figure 3:
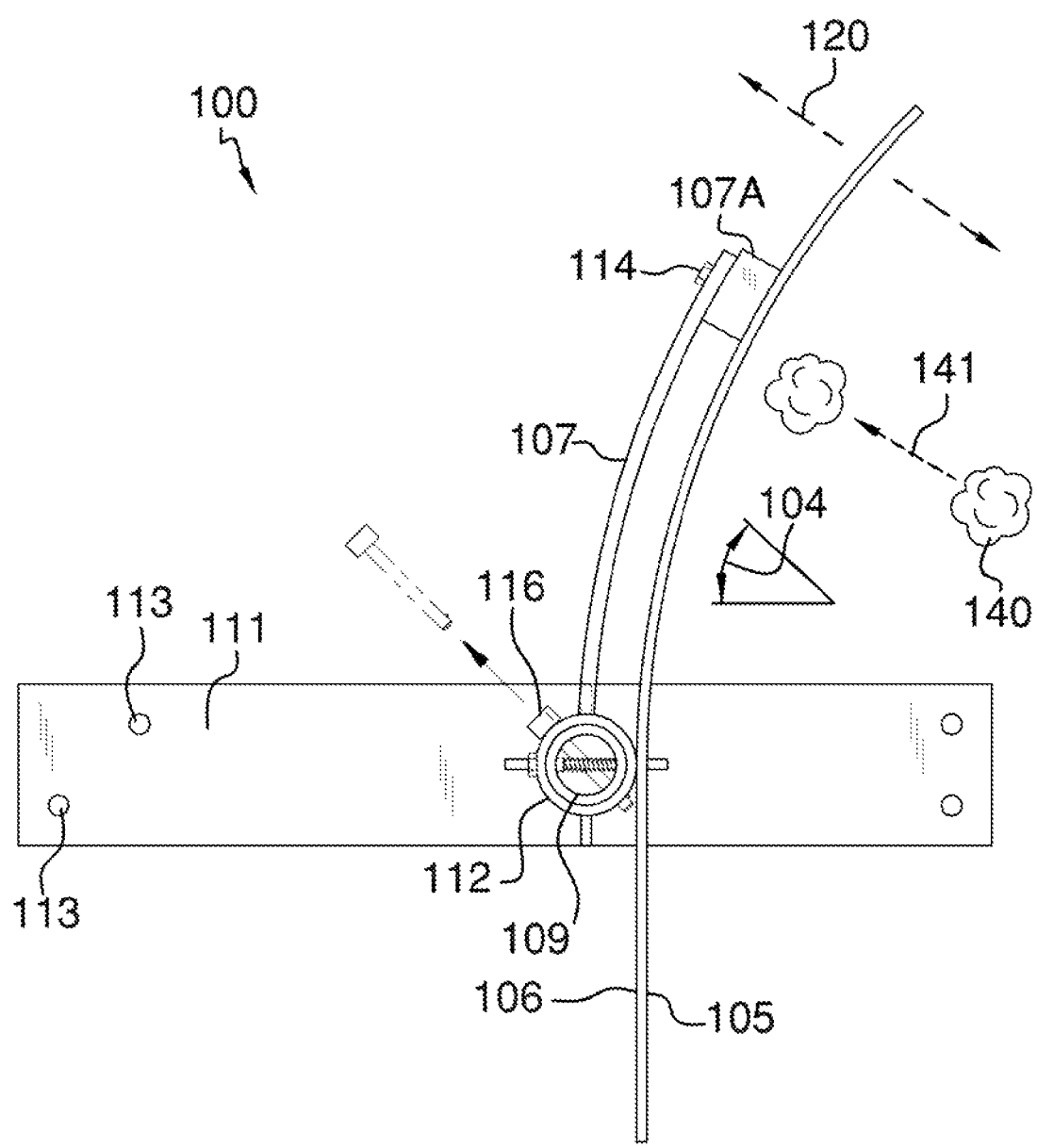
Figure 4:
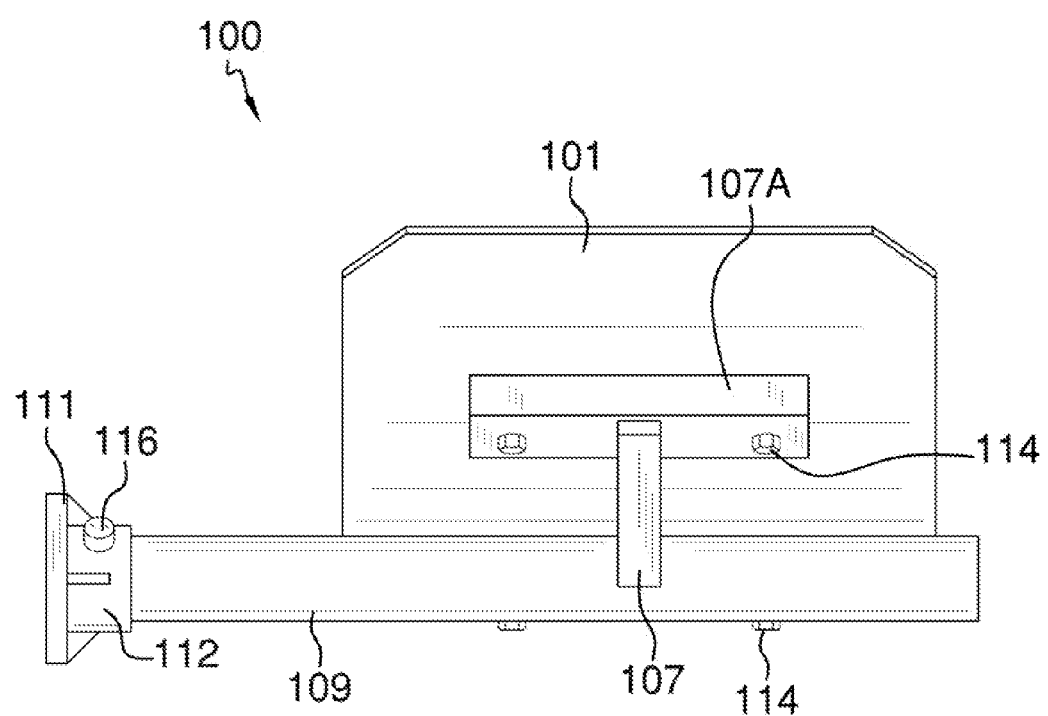
FIG. 4 illustrates a top view of the removable fender for a road grader by itself.
Figure 5:
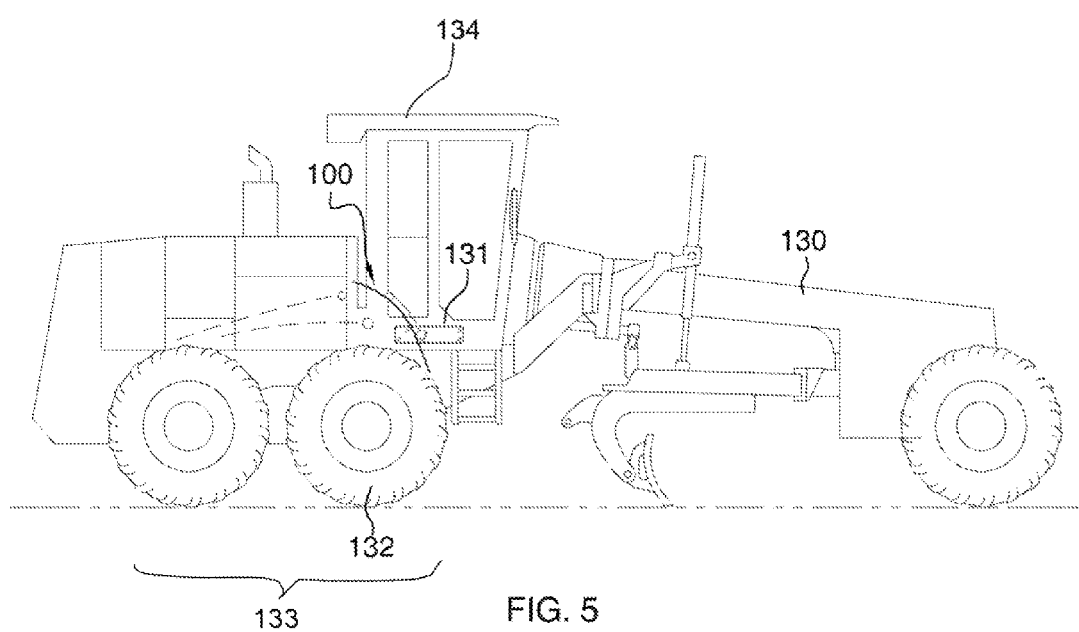
FIG. 5 illustrates a side view of the removable fender installed above and in front of the forward most of the rear tires of the road grader.

Referring to FIG. 3, the curved support 107 provides flexation to absorb any forces attributed with debris 140 impacting the inner surface 105 of the fender 101 when the invention 100 is in use. It shall be noted that the term debris 140 is being used to denote materials that are thrown upwardly and that shall impact the inner surface 105 of the fender 101. Moreover, the debris 140 shall generate a force 141 when impacted against the fender 101, and said force 141 is absorbed via flexation 120 absorbed via the curved support 107.

The fender arm 109 is a cylindrically-shaped object of an undefined length 110. The fender arm 109 extends inwardly with respect to a road grader 130. The fender arm 109 attaches to a mounting plate 111 via a gusseted mounting bracket 112.

The mounting plate 111 is a rectangularly-shaped object that attaches to a side surface 131 of the road grader 130 such that upon attachment of the fender arm 109, the fender 101 shall be positioned immediately adjacent to and ahead of forward most tire 132. It shall be noted that the road grader 130 typically includes a plurality of rear tires 133, and that the forward most rear tire 132 is closest a cab portion 134 of the road grader 130.

The mounting plate 111, when installed on the side surface 131 of the read grader 130, shall remain a permanent fixture to the road grader 130. The mounting plate 111 includes mounting holes 113 from which a fastening means 114 affixes the mounting plate 111 to the side surface 131 of the road grader 130. Moreover, the fastening means 114 comprises the use of bolts and nuts, machine screws, or rivets.

The gusseted mounting bracket 112 includes a clevis pinhole 115 for securement of the fender arm 109 to the gusseted mounting bracket 112. A clevis pin 116 can attach and remove with respect to the gusseted mounting bracket 112 in order to attach or detach the fender arm 109 with respect to the road grader 130. It shall be noted that a principle objective of the invention 100 is the ability to attach and remove the fender 101 from the road grader 130 as needed.

In referring to FIG. 3, the clevis pin 116 passes across both the fender arm 109 and the gusseted mounting bracket 112. The gusseted mounting bracket 112 is essentially a hollowed cylinder that supports the fender arm 109 at a right angle with respect to the side surface 131 of the road grader 130.

It shall be further noted that the fender arm 109 may further attach to the fender 101 via fastening means 114 there between. That being said, the fender arm 109 and the curved support 107 provide two points of contact with the fender 101, which shall further limit the ability of the fender 101 to rotate or twist when impacted with debris 140. The cross brace 107A may further secure itself to the fender 101 via fastening means 114.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A removable fender for a road grader comprising:
   a fender from which a curved support attaches to an outer surface and extends downwardly to connect with a fender arm extending inwardly and temporarily affixed to a mounting plate;
   wherein the mounting plate is affixed to an outer surface of a road grader and which places the fender immediately adjacent to and above a forward most tire of rear tires of said road grader in order to protect said road grader from flying debris associated with use of said road grader;
   wherein the fender has a curvature to provide improve coverage and protection against flying debris;
   wherein the fender is further defined with an inner surface;
   wherein the curved support attaches to the outer surface of the fender; wherein the curved support includes a cross brace that forms a "T" shape to the cross brace;
   wherein the cross brace improves the connection between the fender and the curved support by reducing any torsional forces produced there between; wherein the curved support extends downwardly and connects at a distal end to a fender arm; wherein the curved support provides flexation to absorb any forces attributed with debris impacting the inner surface of the fender when the fender is in use.

2. The removable fender for a road grader as described in claim 1 wherein the fender arm is a cylindrically-shaped object of an undefined length; wherein the fender arm extends from the curved support inwardly with respect to a road grader.

3. The removable fender for a road grader as described in claim 2 wherein the fender arm attaches to the mounting plate via a gusseted mounting bracket; wherein the mounting plate is a rectangularly-shaped object; wherein the mounting plate includes mounting holes from which a fastening means affixes the mounting plate to the side surface of the road grader; wherein the fastening means comprises bolts and nuts, machine screws, or rivets.

4. The removable fender for a road grader as described in claim 2 wherein the gusseted mounting bracket includes a clevis pinhole for securement of the fender arm to the gusseted mounting bracket; wherein a clevis pin attaches and remove with respect to the gusseted mounting bracket in order to attach or detach the fender arm with respect to the road grader, respectively.

5. The removable fender for a road grader as described in claim 3 wherein the fender arm attaches to the fender via the fastening means there between.

6. A removable fender for a road grader comprising:
   a fender from which a curved support attaches to an outer surface and extends downwardly to connect with a fender arm extending inwardly and temporarily affixed to a mounting plate;
   wherein the mounting plate is affixed to an outer surface of a road grader and which places the fender immediately adjacent to and above a forward most tire of rear tires of said road grader in order to protect said road grader from flying debris associated with use of said road grader;
   wherein the fender has a curvature to provide improve coverage and protection against flying debris;
   wherein the fender is further defined with an inner surface;
   wherein the curved support attaches to the outer surface of the fender; wherein the curved support includes a cross brace that forms a "T" shape to the cross brace;
   wherein the cross brace improves the connection between the fender and the curved support by reducing any torsional forces produced there between; wherein the curved support extends downwardly and connects at a distal end to a fender arm; wherein the curved support provides flexation to absorb any forces attributed with debris impacting the inner surface of the fender when the fender is in use.

7. The removable fender for a road grader as described in claim 6 wherein the fender arm is a cylindrically-shaped object of an undefined length; wherein the fender arm extends from the curved support inwardly with respect to a road grader.

8. The removable fender for a road grader as described in claim 7 wherein the fender arm attaches to the mounting plate via a gusseted mounting bracket; wherein the mounting plate is a rectangularly-shaped object; wherein the mounting plate includes mounting holes from which a fastening means affixes the mounting plate to the side surface of the road grader; wherein the fastening means comprises bolts and nuts, machine screws, or rivets.

9. The removable fender for a road grader as described in claim 8 wherein the gusseted mounting bracket includes a clevis pinhole for securement of the fender arm to the gusseted mounting bracket; wherein a clevis pin attaches and remove with respect to the gusseted mounting bracket in order to attach or detach the fender arm with respect to the road grader, respectively.

10. The removable fender for a road grader as described in claim 9 wherein the fender arm attaches to the fender via the fastening means there between.

* * * * *